(12) United States Patent
Imaeda (10) Patent No.: US 9,656,594 B2
(45) Date of Patent: *May 23, 2017

(54) HEADLIGHT LIGHT DISTRIBUTION CONTROL DEVICE AND METHOD

(71) Applicant: DENSO CORPORATION, Kariya, Aichi-pref. (JP)

(72) Inventor: Koji Imaeda, Inazawa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,572

(22) Filed: Jun. 9, 2016

(65) Prior Publication Data

US 2016/0288697 A1    Oct. 6, 2016

Related U.S. Application Data

(63) Continuation of application No. 14/234,845, filed as application No. PCT/JP2012/068428 on Jul. 20, 2012, now Pat. No. 9,387,796.

(30) Foreign Application Priority Data

Jul. 28, 2011  (JP) .................................. 2011-165625

(51) Int. Cl.
*B60Q 1/14* (2006.01)
*B60Q 1/08* (2006.01)
*B60Q 1/02* (2006.01)

(52) U.S. Cl.
CPC ................. *B60Q 1/08* (2013.01); *B60Q 1/02* (2013.01); *B60Q 1/143* (2013.01); *B60Q 1/1423* (2013.01);

(Continued)

(58) Field of Classification Search
CPC ..................................... B60Q 1/14; B60Q 1/02
(Continued)

(56) References Cited

U.S. PATENT DOCUMENTS 5,187,383 A * 2/1993 Taccetta ................. B60Q 1/143
307/10.8
5,796,094 A    8/1998 Schofield et al.
(Continued)

FOREIGN PATENT DOCUMENTS

DE    102009048849 A1    5/2010
EP         1028025 A2    8/2000
(Continued)

OTHER PUBLICATIONS

International Search Report for PCT/JP2012/068428, ISA/JP, mailed Oct. 16, 2012.
(Continued)

*Primary Examiner* — Tung X Le
(74) *Attorney, Agent, or Firm* — Harness, Dickey & Pierce, P.L.C.

(57) ABSTRACT

Speed of a vehicle is acquired from a speed detecting device, and then a beam switching threshold, according to the acquired speed, of an irradiation direction of a headlight is initially set. When the number of appearance (i.e. frequency of appearance) of a light source in a predetermined time detected by a light source detection means have become the beam switching threshold or more, the headlight is switched to a low beam. When a predetermined time (beam switching prohibition time Tp) has been passed after the irradiation direction of a headlight was switched to the low beam, the irradiation direction of the headlight is switched to a high beam.

10 Claims, 8 Drawing Sheets

(52) U.S. Cl.
CPC .. *B60Q 2300/056* (2013.01); *B60Q 2300/112* (2013.01); *B60Q 2300/3321* (2013.01); *B60Q 2300/41* (2013.01); *B60Q 2300/42* (2013.01)

(58) Field of Classification Search
USPC .................. 315/77, 80, 82; 307/10.1, 10.8
See application file for complete search history.

(56) References Cited

U.S. PATENT DOCUMENTS

| | | | |
|---|---|---|---|
| 5,877,680 | A | 3/1999 | Okuchi et al. |
| 7,541,743 | B2 | 6/2009 | Salmeen et al. |
| 8,400,284 | B2 * | 3/2013 | Kracker ............... B60Q 1/143 340/426.25 |
| 8,866,387 | B2 | 10/2014 | Futamura et al. |
| 2007/0268159 | A1 | 11/2007 | Futamura |
| 2010/0091513 | A1 | 4/2010 | Kamioka |
| 2010/0102990 | A1 | 4/2010 | Kamioka |
| 2010/0316258 | A1 | 12/2010 | Krokel et al. |
| 2011/0025209 | A1 | 2/2011 | Nakanishi et al. |

FOREIGN PATENT DOCUMENTS

| | | |
|---|---|---|
| JP | H10-166933 A | 6/1998 |
| JP | H11-245715 A | 9/1999 |
| JP | 2000-229533 A | 8/2000 |
| JP | 2007-308012 A | 11/2007 |
| JP | 2008-037240 A | 2/2008 |
| JP | 2010-092422 A | 4/2010 |
| JP | 2010-096668 A | 4/2010 |
| JP | 2011-016440 A | 1/2011 |
| JP | 2011-505612 A | 2/2011 |

OTHER PUBLICATIONS

Office Action issued May 13, 2014 in corresponding JP Application No. 2011-165625 (with English translation).
International Preliminary Report on Patentability for PCT/JP2012/068428 (with English translation).

* cited by examiner

HEADLIGHT LIGHT DISTRIBUTION CONTROL DEVICE AND METHOD

CROSS-REFERENCE TO RELATED APPLICATIONS

This application continuation of U.S. patent application Ser. No. 14/234,845 filed Jan. 24, 2014 which is a 371 U.S. National Stage of International Application No. PCT/JP2012/068428, filed Jul. 20, 2012, which claims the benefit of Japanese Patent Application No. 2011-165625, filed Jul. 28, 2011. The disclosures of the above applications are incorporated by reference herein.

TECHNICAL FIELD

The present invention relates to a headlight light distribution control device that performs switching control of an irradiation direction of a headlight for a vehicle.

BACKGROUND ART

Conventionally, there is a device that automatically switches an irradiation direction of a headlight up/down depending on whether or not an oncoming vehicle, a preceding vehicle, or the like is present. The device detects a light source, such as the headlight of an oncoming vehicle or the like, from an image of a region ahead of a vehicle captured by a camera, considers the oncoming vehicle or the like to be present when the light source is detected, and switches the irradiation direction of the headlight of the vehicle (see PATENT DOCUMENT 1).

PRIOR ART DOCUMENTS

Patent Documents

[PATENT DOCUMENT 1] Japanese laid-open patent JP-A-2008-37240

SUMMARY OF THE INVENTION

Subject to be Solved by the Invention

However, when the irradiation direction of the headlight of the vehicle is switched based only on whether or not the oncoming vehicle or the like is present, or in other words, whether or not the light source of the oncoming vehicle or the like is present, for example, in an instance in which oncoming vehicles successively pass by or an instance in which there are numerous streetlights, lights from buildings, and the like, such as when traveling through an urban area, because the headlights of the oncoming vehicles that pass by, the streetlights, and the like are successively detected as light sources, the irradiation direction of the headlight is frequently switched. Therefore, a problem occurs in that a driver may possibly experience discomfort.

The present invention has been achieved in light of the above-described issue. An object of the present invention is to provide a headlight light distribution control device that performs switching control of an irradiation direction of a headlight so as not to cause a driver discomfort. Other objects of the present invention will become clear from the specification, drawings, and particularly the expressions of each claim in the scope of claims.

Means for Solving Subject

The present invention has been achieved to solve the above-described issue, and is configured such as to be provided with a light source detector (10) in the front of a vehicle and detect an appearance frequency of a light source, and when the appearance frequency is a predetermined threshold value or more, keep an irradiation direction of a headlight (60) at low beam for a predetermined amount of time.

Specifically, as described in claim 1, a headlight light distribution control device (1) of the present invention comprises:

(A) the light source detector (10) that detects a light source of a region ahead of the vehicle; and (B) a control device (20) that controls the irradiation direction of the headlight (60), wherein the control device (20) includes (b-1) a light source presence counter (241) that acquires information on the presence of a light source of a region ahead of the vehicle per predetermined time interval $\Delta t$ from the light source detector (10) and counts the number of times the light source of a region ahead of the vehicle changes from "not present" to "present", (b-2) a threshold-reached judging means (242) that judges whether or not the number of times counted by the light source presence counter (241) has reached a predetermined threshold value (beam switching threshold value: $\alpha$) within a predetermined amount of time (light source appearance frequency observation time Tm), and (b-3) a beam maintaining means (223) that, when the number of times counted by the light source presence counter (241) is judged to have reached the predetermined threshold value (beam switching threshold value) by the threshold-reached judging means (242), keeps the headlight (60) at low beam for a predetermined amount of time (beam switching prohibited time Tp).

Operation of the above-described configuration will be described. In the headlight light distribution control device (1) of the present invention, during cruising, as a first step, the light source appearance frequency observation time Tm is set, and the number of appearance of a light source during the time is observed. During the observation, the light source presence counter (241) acquires information regarding the presence of a light source of a region ahead of the vehicle per predetermined time interval from the light source detector (10), and counts the number of times the light source of a region ahead of the vehicle changes from "not present" to "present". Then, when the count number reaches a predetermined threshold value (beam switching threshold value: $\alpha$) during the light source appearance frequency observation time Tm, the headlight (60) remains kept at low beam during the beam switching prohibited time Tp. During the light source appearance frequency observation time Tm, the irradiation direction of the headlight is switched at each light source appearance. Therefore, the appearance frequency of the light source during the light source appearance frequency observation time Tm is directly equivalent to the beam switching frequency.

As a result, for example, in an instance in which the appearance frequency of the light source (50) is numerous, such as when there are numerous oncoming vehicles (70) or during travel through an urban area, the irradiation direction of the headlight (60) is at low beam for a predetermined amount of time. In other words, the state remains unchanged at low beam for a predetermined amount of time. Therefore, because the irradiation direction of the headlight (60) does not frequently change, the driver does not experience discomfort. The control can be performed by a simple process in which judgment is made regarding whether or not the number of times the light source (50) appears within the light source appearance frequency observation time Tm is a predetermined threshold value (α) or more.

In addition, when the number of times the light source (50) appears within the predetermined amount of time reaches the predetermined threshold value (α), it is very likely that there are numerous oncoming vehicles (70) or the vehicle is traveling through an urban area. Therefore, in this instance, because the oncoming vehicle (70) is not irradiated as a result of the irradiation direction of the headlight (60) being set to low beam, the driver of the oncoming vehicle (70) is not dazzled by the light from the headlight (60) and safe driving can be ensured.

Here, as recited in claim 2, acquisition of the information on the presence of the light source of a region ahead of the vehicle by the light source presence counter (241) may be performed at a time interval Δt=T/2, when a value that the shorter time of either the light source appearance frequency observation time Tm or the beam switching prohibited time Tp is divided by N (N being an integer satisfying N≥α) is T.

As a result, whether or not the appearance frequency of the light source (the number of times the light source changes from "not present" to "present" during a predetermined amount of time; in other words, equivalent to the number of times the beam is switched) has reached the beam switching threshold value α can be effectively detected.

Here, as recited in claim 3, the control device (20) may have a beam switching means (244) that switches the headlight (60) to high beam when the beam switching prohibited time Tp has elapsed.

As a result, because the irradiation direction of the headlight (60) is set to high beam when a predetermined amount of time (beam switching prohibited time Tp) has elapsed after the irradiation direction of the headlight (60) is changed to low beam, long-distance visibility by the driver can be ensured and this is convenient. In addition, because the irradiation direction does not become high beam immediately after the irradiation direction is set to low beam, the driver does not experience discomfort.

Here, as recited in claim 4, switching of the headlight (60) to high beam can be configured such that, to an actuator (62) configured by a driving section (622) that switches the irradiation direction of the headlight (60) and a drive control section (624) that drives the driving section (622) according to a command from a CPU (22), the beam switching means (244) transmits a control signal for switching the irradiation direction of the headlight (60) to the drive control section (624), and the drive control section (624) switches the irradiation direction of the headlight (60) on the basis of the transmitted control signal. As a result, switching to high beam can be easily controlled by the CPU (22).

Although various methods, such as the use of a light sensor such as a CdS (cadmium sulfide) sensor, can be considered for the detection of the light source (50) by the light source detector (10), as recited in claim 5, the light source detector (10) may be configured such that provides an imaging device (12) configured by, for example, a CCD camera that captures in image of a region ahead of the vehicle, and an image processing section (14) that detects whether or not a light source is present in a region ahead of the vehicle by processing the image of a region ahead of the vehicle captured by the imaging device (12).

As a result, not only merely brightness, but also the shape and the like of the light source (50) of a region ahead of the vehicle (40) can be detected as the light source. As the image processing by the image processing section (14), because a known method, such as binarization, Hough transform, or color distinction, can be used, the light source detector (10) can be easily configured.

The appearance frequency of the light source (50) within the predetermined amount of time detected by the light source detector (10) changes depending on the cruising speed of the vehicle (40). For example, in an instance in which the light source (50) of a region ahead of the vehicle (40) is set at a fixed interval such as with streetlights, when the speed of the vehicle (40) increases, the frequency of the light source appearing within the predetermined amount of time, or in other words, the appearance frequency increases compared to when the speed is slow.

Therefore, as recited in claim 6, the headlight light distribution control device (1) may include a speed detecting device (30) that detects the speed of the vehicle, and in addition, a plurality of values appropriate to vehicle speed are set in advance as beam switching threshold values, and a threshold adjusting means (245) may be provided which uses the beam switching threshold value appropriate to the vehicle speed detected by the speed detecting device (30).

As a result, the time interval at which the headlight (60) is switched during the light source appearance frequency observation time Tm can be made almost the same when the speed of the vehicle (40) is high and when the speed is low. In other words, the driver does not experience discomfort even when speed change of the vehicle (40) occurs.

Although in the above-described "MEANS FOR SOLVING SUBJECT", reference numbers used in "EMBODIMENT FOR CARRYING OUT THE INVENTION" are added to facilitate understanding of the invention, it goes without saying that the reference numbers are not intended to limit the interpretation of the scope of claims.

BRIEF DESCRIPTION OF THE DRAWINGS

FIG. 8(a) is a diagram showing an example in which beam switching threshold values corresponding to speed are expressed by frequency (number of times/second), and (b) is a diagram showing an example of the beam switching threshold values (number of times) corresponding to the speed.

EMBODIMENT FOR CARRYING OUT THE INVENTION

Although an embodiment to which the present invention is applied will be described with reference to the drawings, embodiments of the present invention are not in any way limited by the following embodiment and various embodiments are possible as long as the embodiments belong within the technical scope of the present invention.

Figure 1:
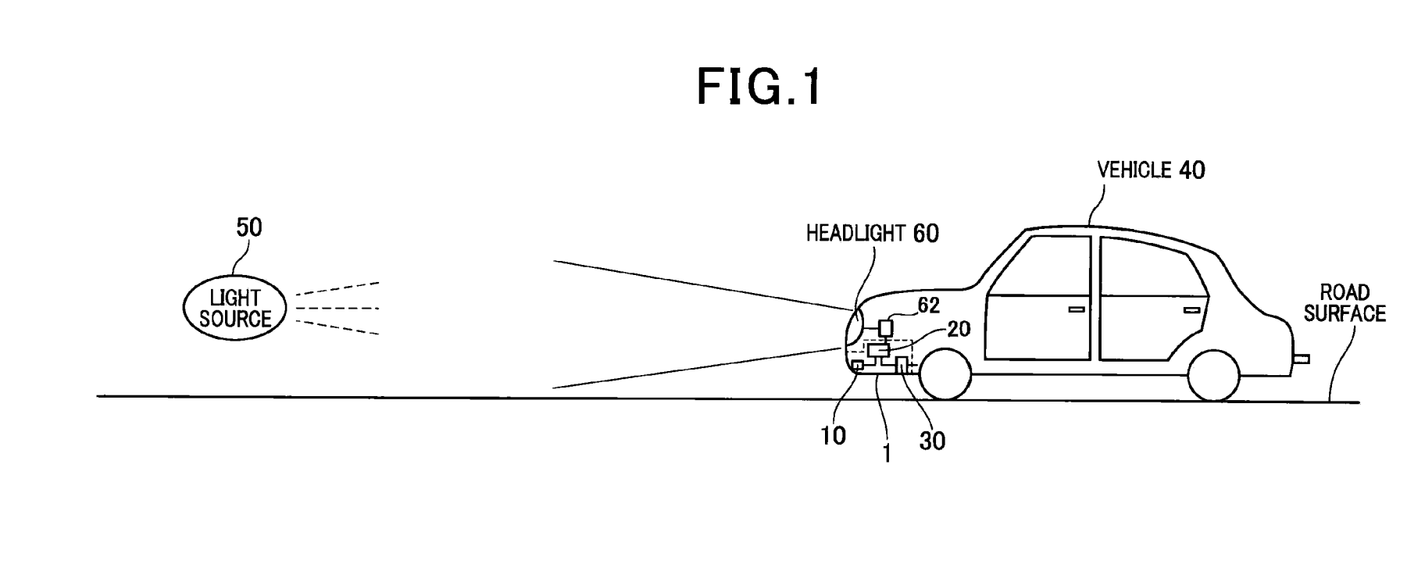
FIG. 1 is a schematic diagram showing a usage state of a headlight light distribution control device of the present invention.

As shown in FIG. 1, a headlight light distribution control device 1 of the present invention is mounted in a vehicle 40 and has a light source detector 10 that detects whether or not a light source 50 that appears in a region ahead of the vehicle during cruising is present, the light source detector 10 being provided in a front area of the body of the vehicle 40 or inside the vehicle. When the number of times the light source appears within a predetermined amount of time (in other words, the appearance frequency of the light source) detected by the light source detector 10 reaches a predetermined threshold value, a headlight 60 is kept at low beam for a predetermined amount of time.

In addition, the headlight light distribution control device 1 of the present invention is configured by a speed detecting device 30, and a control device 20 that makes an actuator 62 perform beam switching of the headlight 60 based on information acquired from the light source detector 10 and the speed detecting device 30. Hereafter, a specific configuration of the headlight light distribution control device 1 will be described with reference to FIG. 2.

Figure 2:
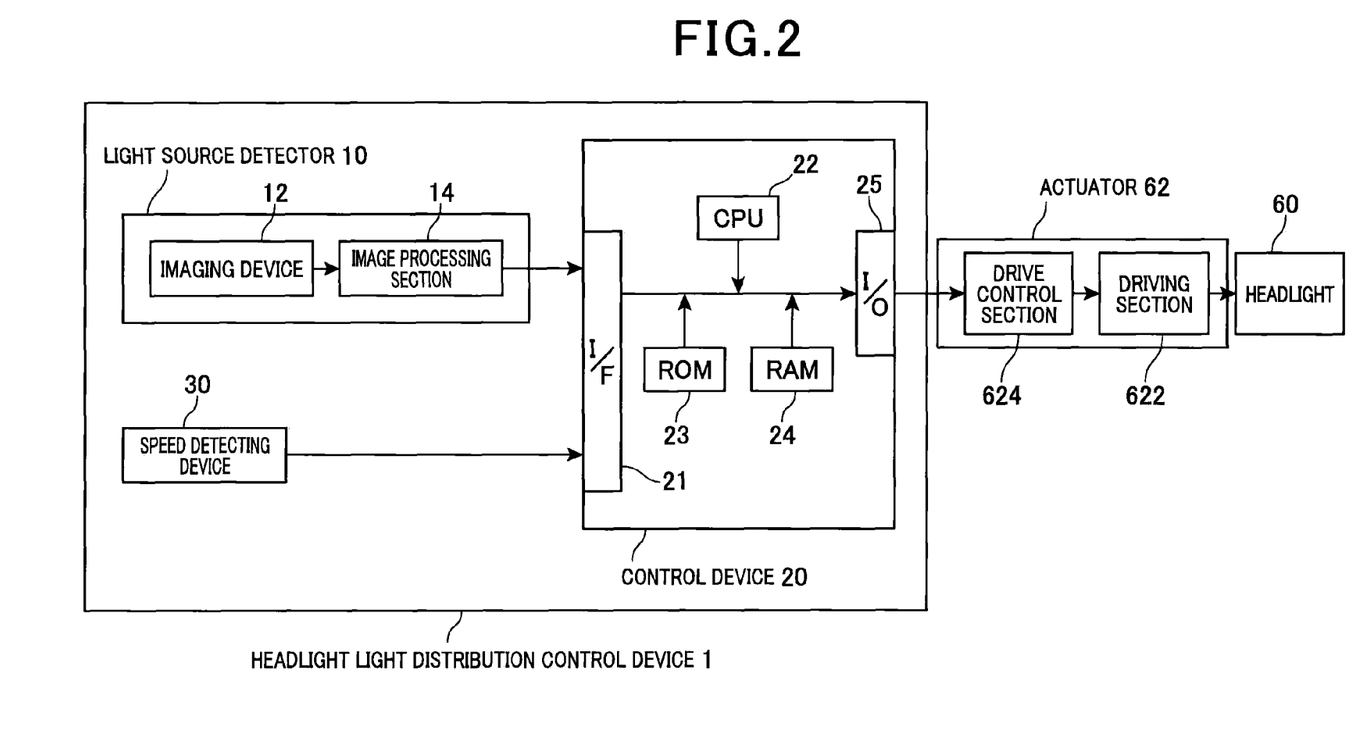
FIG. 2 is a block diagram showing a configuration of the headlight light distribution control device of the present invention.

The light source detector 10 detects the light source 50 of a region ahead of the vehicle 40. As the light source detector 10, a light sensor configured by a semiconductor, such as a CdS (cadmium sulfide) sensor, can be used. Although the light sensor judges whether or not the light source 50 is present from the degree of detected brightness, preferably, a configuration including an imaging device 12, such as a visible light camera like a CCD camera, or an infrared camera, and an image processing section 14 is used.

As the image processing section 14, a known image processing section can be used. As hardware, the image processing section 14 is configured by a central processing unit (CPU), a read-only memory (ROM), a random access memory (RAM), and an input/output (I/O), a FPGA (field-programmable gate array) in which the foregoing are configured by a single semiconductor chip, or the like (not shown), and detects the light source 50 of a region ahead of the vehicle 40 by an image of a region ahead of the vehicle 40 acquired by the imaging device 12 being inputted and the inputted image being image-processed by software. As the image processing, because a known method, such as binarization, Hough transform, or color distinction, can be used, detailed description is omitted.

According to the configuration, not only merely brightness, but also the shape of the light source 50 of a region ahead of the vehicle 40 can be detected. As the light source detected by the image processing section 14, there is the headlamp of an oncoming vehicle cruising in an opposing lane of a region ahead of the vehicle 40, a tail lamp of a preceding vehicle cruising on the same cruising lane as the vehicle 40, streetlights and light from buildings of a region ahead of the vehicle 40, and the like.

The speed detecting device 30 is a meter for detecting the cruising speed of the vehicle 40 and, in addition to that which detects the speed by measuring the rotation speed of the axle per unit time by an encoder, can be that which detects the speed by an output voltage of a tachogenerator that outputs a voltage proportional to the rotation speed of the axle per unit time.

The control device 20 has, as hardware, an interface 21 for inputting information from the light source detector 10 and/or the speed detecting device 30, a CPU 22, a ROM 23 storing programs and data run by the CPU 22, a RAM 24 serving as a work area for the CPU, and an I/O (25) used by the CPU 22 to output signals to the actuator 62.

Figure 3:
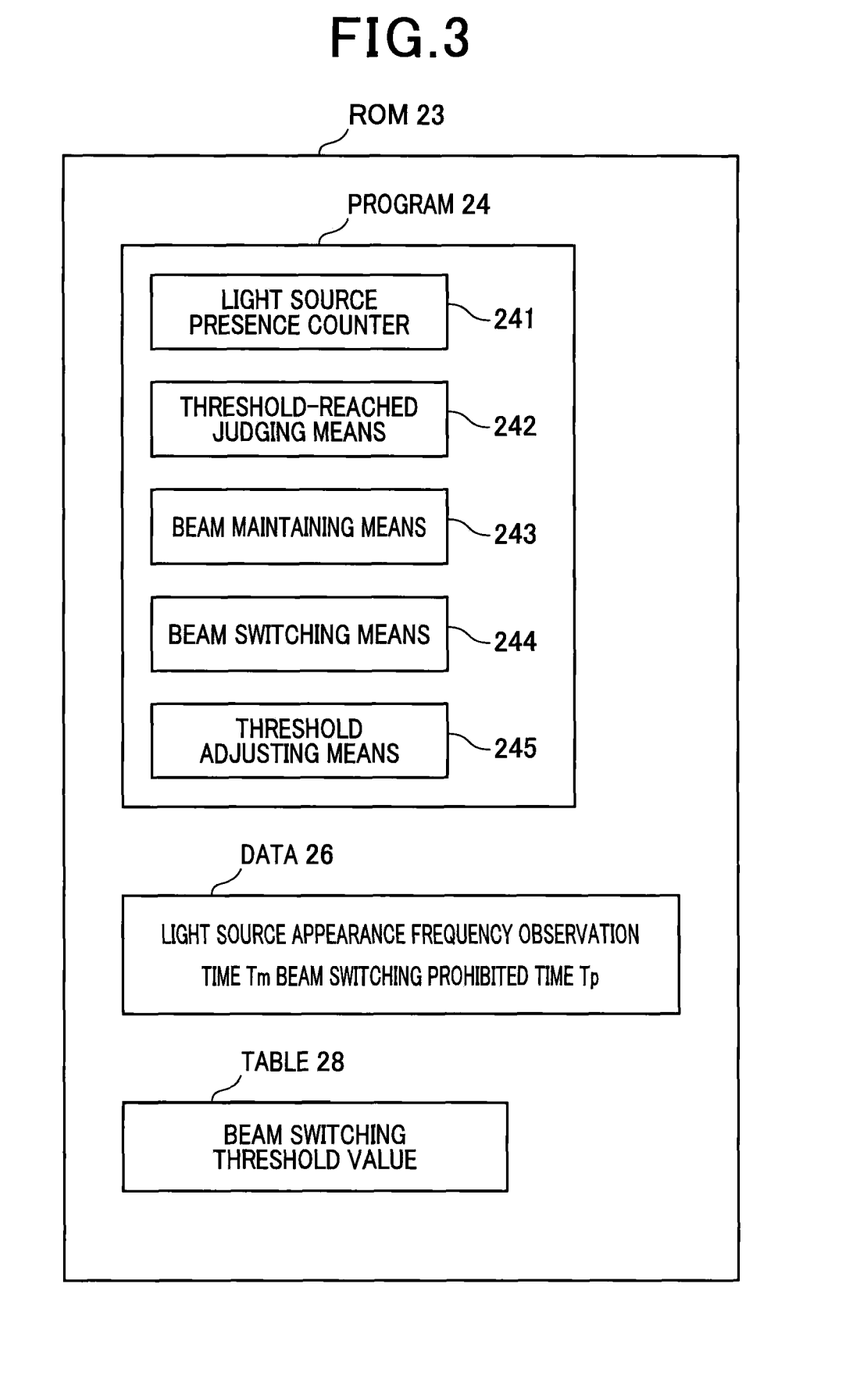
FIG. 3 is diagram showing the details of programs and the like stored in a ROM.

The programs, data, and tables run by the CPU 22 are stored in advance in the ROM 23 and used, as shown in FIG. 3.

Examples of the types and functions of the programs 24 stored in the ROM 23 will hereinafter be described.

(a) Light Source Presence Counter 241

The light source presence counter 241 acquires information on the presence of a light source of a region ahead of the vehicle per predetermined time interval $\Delta t$ from the light source detector 10 and counts the number of times the light source of a region ahead of the vehicle changes from "not present" to "present".

(b) Threshold-Reached Judging Means 242

The threshold-reached judging means 242 has a timer, and while measuring the time from start-up until when a light source appearance frequency observation time Tm is reached, judges whether or not the number of times counted by the light source presence counter 241 has reached a predetermined threshold value (beam switching threshold value: $\alpha$) within the light source appearance frequency observation time Tm.

(c) Beam Maintaining Means 243

When the number of times counted by the light source presence counter 241 is judged to have reached the predetermined threshold value (beam switching threshold value: $\alpha$) by the threshold-reached judging means 242, the beam maintaining means 243 starts up a timer and keeps the headlight 60 at low beam until a beam switching prohibited time Tp is reached.

(d) Beam Switching Means 244

The beam switching means 244 switches the headlight to high beam when the beam switching prohibited time Tp has elapsed.

(e) Threshold Adjusting Means 245

The threshold adjusting means 245 acquires a beam switching threshold value corresponding to vehicle speed based on the vehicle speed detected by the speed detecting device 30 and performs reset.

Data 26 stored in the ROM 23 are the light source appearance frequency observation time Tm and the beam switching prohibited time Tp.

In addition, beam switching threshold values corresponding to speed are stored as a table 28 in the ROM 23. The beam switching threshold values will hereinafter be described.

The appearance frequency of the light source 50 within a predetermined amount of time detected by the light source detector 10 changes depending on the cruising speed of the vehicle 40. For example, in an instance in which the light source 50 of a region ahead of the vehicle 40 is set at a fixed interval such as with streetlights, when the speed of the vehicle 40 increases, the frequency of the light source appearing within the predetermined amount of time increases compared to when the speed is slow. Therefore, when, as the beam switching threshold values, a plurality of beam switching threshold values based on the vehicle speed measured by the speed detecting device 30 are set in advance and stored in the ROM 23 as a table, the beam switching threshold value can be changed according to the vehicle speed detected by the speed detecting device 30. As a result, the time interval at which the headlight (60) is switched during the light source appearance frequency observation time Tm can be made almost the same when the speed of the vehicle 40 is high and when the speed is low. In other words, the driver does not experience discomfort even when speed change of the vehicle 40 occurs.

Figure 8:
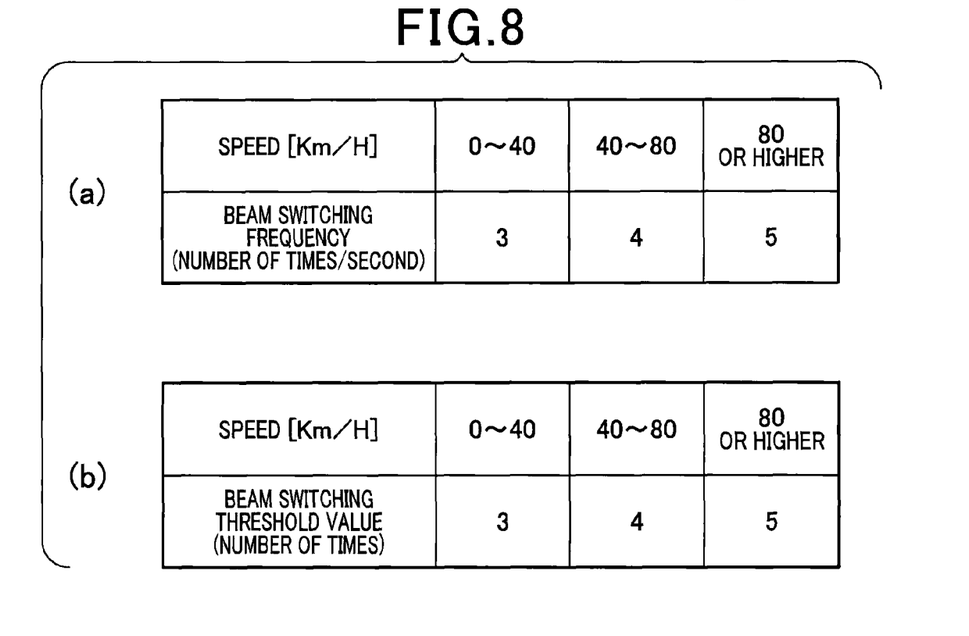

An example in which the beam switching threshold values corresponding to speed are expressed by frequency (number of times/second) is shown in (a) of FIG. 8. As shown in the drawing, the frequency is set such as to increase as the speed of the vehicle 40 increases, such as 3[times/second] when the speed of the vehicle 40 is 0 to 40[Km/H], 4[times/second] when the speed is 40 to 80[Km/H], and 5[times/second] when the speed is 80[Km/H] or higher. A reason for this is that, in an instance in which, for example, the light source 50 of a region ahead of the vehicle 40 is set at a fixed interval such as with streetlights, when the speed of the vehicle 40 increases, the frequency of the light source 50 detected within a predetermined amount of time is greater compared to when the speed is slow. Therefore, when the beam switching threshold value is set to increase as the speed of the vehicle 40 increases, even when the speed of the vehicle is fast or the speed is slow during the light source appearance frequency observation time Tm, the time interval at which the headlight 60 is switched can be made almost the same.

(b) of FIG. 8 shows the beam switching threshold values (number of times of light source appearance) corresponding with speed when the light source appearance frequency observation time Tm is one second, based on the frequencies in (a) of FIG. 8. It will be easily understood that, should the light source appearance frequency observation time Tm be two seconds, the number of times (beam switching threshold value) in the table should be set to twice the value shown in (b) of FIG. 8. In this way, the beam switching threshold value is decided from the values of the frequency shown in (a) of FIG. 8 and the light source appearance frequency observation time Tm (both are set in advance), and the decided beam switching threshold values (number of times) are stored in the ROM 23 as a table. Hereafter, according to the present embodiment, an instance is described in which the light source appearance frequency observation time Tm=1 sec, the vehicle speed is 80[Km/H], and the beam switching threshold value is 5. The threshold adjusting means 245 acquires the beam switching threshold value according to the vehicle speed detected by the speed detecting device 30 and performs reset.

When the beam switching threshold values are stored in advance in the ROM 23 as a table, the table is expanded to the RAM 24 when system power is turned ON, and is used by the CPU 22.

Switching of the irradiation direction of the headlight 60 is performed by the actuator 62. The actuator is configured by a driving section 622 (configured, for example, by a stepper motor) that performs beam switching of the headlight 60 and a drive control section 624 that drives 622 based on a command from the CPU 22.

Figure 4:
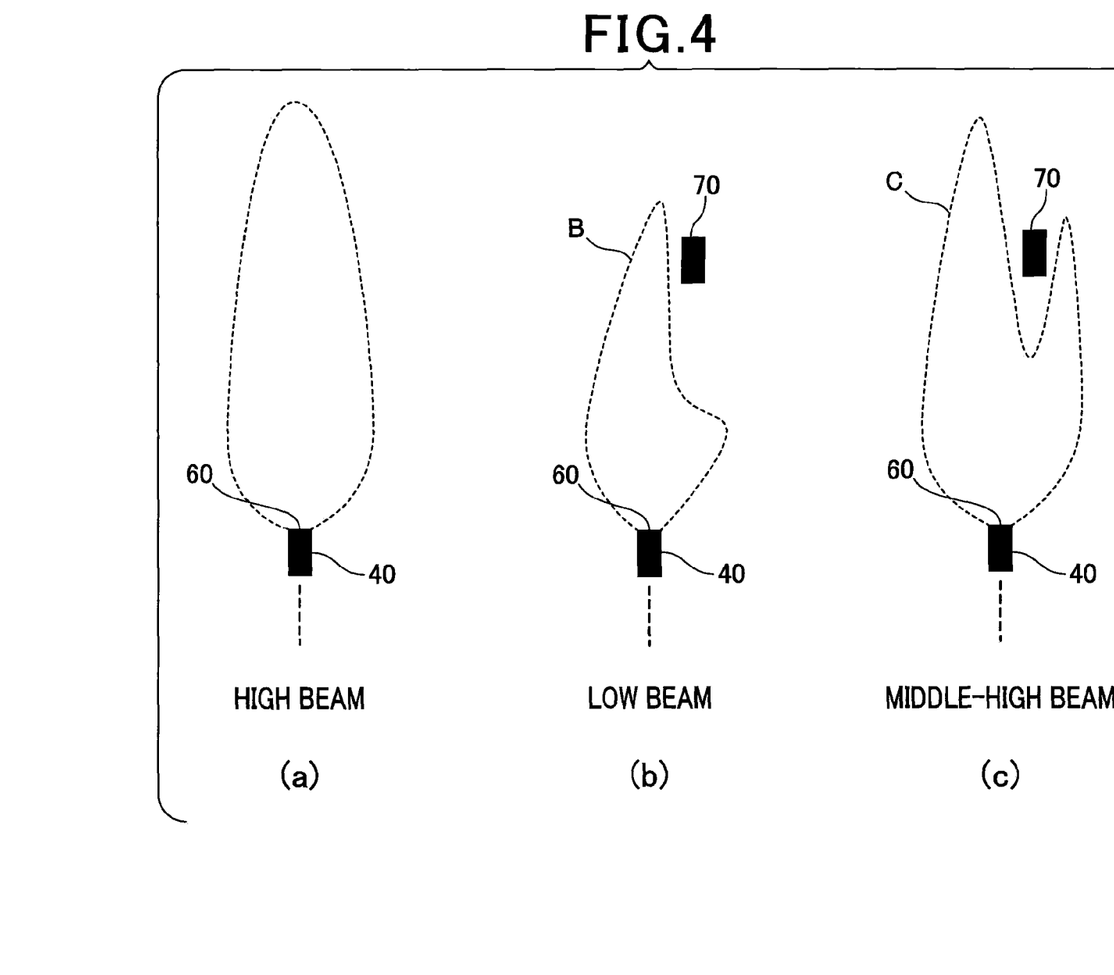
FIG. 4 is a diagram of an irradiation area of a headlight viewed from above the vehicle.
Figure 5:
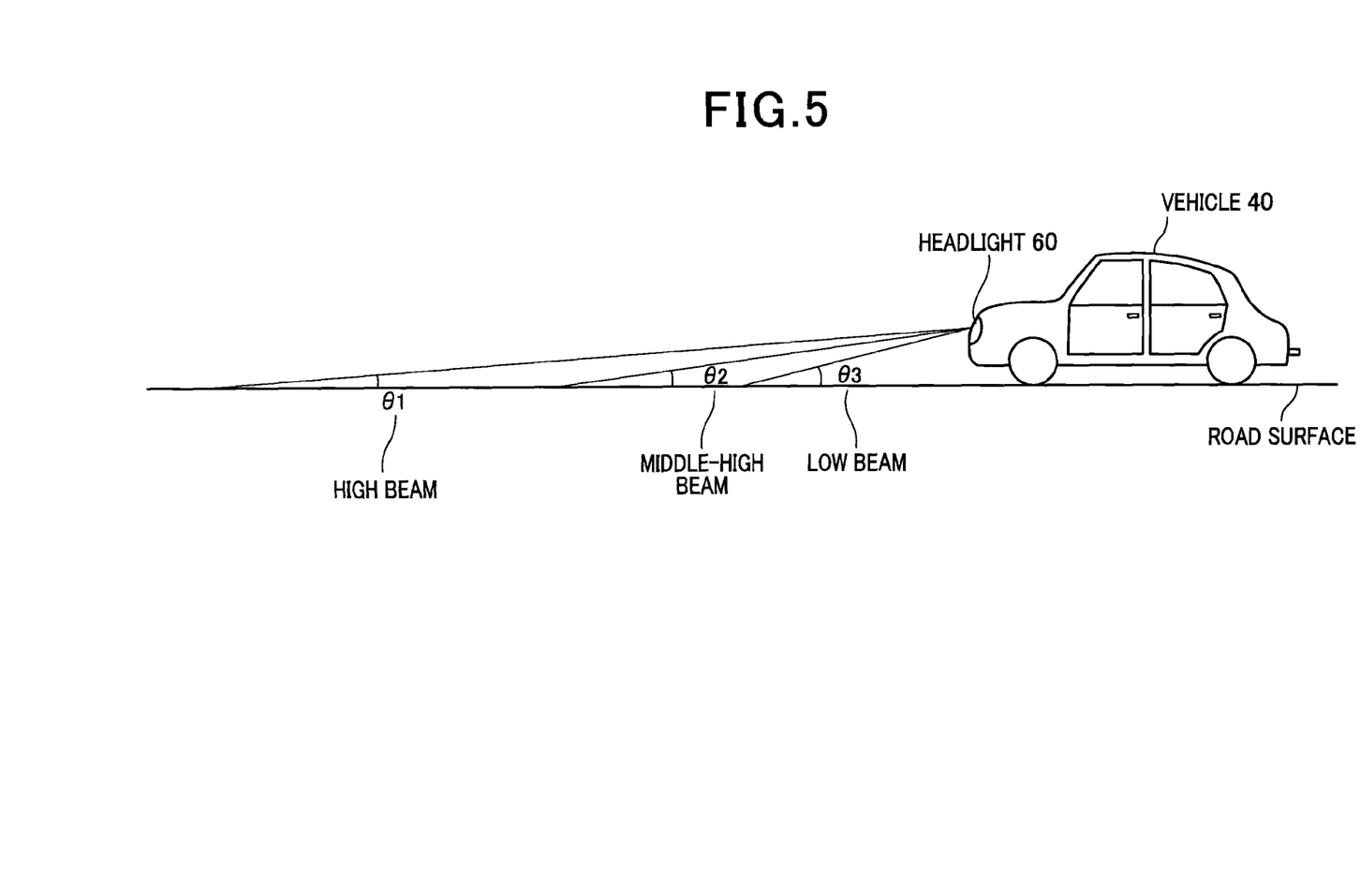
FIG. 5 is a diagram of the irradiation area of the headlight viewed from a side direction of the vehicle.

Here, irradiation states of a road surface of a region ahead of the vehicle 40 when the irradiation direction of the headlight 60 is set to high beam, low beam, and middle-high beam will be described with reference to FIG. 4 and FIG. 5. FIG. 4 is a diagram in which the road surface on which the vehicle 40 and an oncoming vehicle 70 are present is viewed from above, to show a relationship between the irradiation area and the oncoming vehicle 70 when the irradiation direction of the headlight 60 is changed. FIG. 5 is a diagram in which the road surface on which the vehicle 40 and the oncoming vehicle 70 are present is viewed from a side direction of the vehicle.

At high beam, the irradiation direction of the headlight 60 is set to face upward (an irradiation angle θ1 in relation to the road surface is smaller than an irradiation angle θ3 at low beam) (see FIG. 5) and the area ahead of the vehicle 40 is irradiated over a long distance (see (a) of FIG. 4). As indicated by (a) of FIG. 4, a shielded area is not provided at high beam.

At low beam, the irradiation direction of the headlight 60 is set to face downward (the irradiation angle θ3 in relation to the road surface is greater than those at high beam and middle-high beam) such that the road surface near the area of a region ahead of the vehicle 40 is irradiated (see FIG. 5), and a shielded area is provided on the right side in a region ahead of the vehicle 40 so that the oncoming vehicle 70 is not irradiated (see (b) of FIG. 4).

At middle-high beam, the irradiation direction of the headlight 60 is set to face upward (an irradiation angle θ2 in relation to the road surface is smaller than that at low beam and greater than that at high beam) such that an area farther than the area irradiated at low beam is irradiated (see FIG. 5), and further, the shielded area is provided on the front right side within the irradiation area, and only the areas on both left and right sides of the oncoming vehicle 70 are irradiated so that the oncoming vehicle 70 is not directly irradiated (see (c) of FIG. 4). (b) of FIG. 4 and (c) of FIG. 4 show instances of a left-lane driving-specification vehicle, and it goes without saying that, in the instance of a right-lane driving-specification vehicle, the shielded area should be configured at a position differing from that of the left-lane driving-specification vehicle.

Next, light distribution control of the headlight 60 performed by the control device 20 will be described with reference to the drawings. Light distribution control of the headlight light distribution control device 1 is performed, as described above, by the CPU 22 of the control device 20 using various programs stored in the ROM 23.

The light distribution control of the headlight 60 by the headlight light distribution control device 1 of the present invention is performed by the appearance frequency of the light source being observed as a first step. Observation of the appearance frequency of the light source is performed by the number of times the light source 50 appears during the light source appearance frequency observation time Tm, set in advance, being counted.

During the observation, the light source presence counter 241 acquires information regarding the presence of a light source of a region ahead of the vehicle per predetermined time interval Δt from the light source detector 10, increments the counter by one every time the light source of a region ahead of the vehicle changes from "not present" to "present", and adds the number of times. Then, when the counted number (added value) during the light source appearance frequency observation time Tm reaches a predetermined threshold value (beam switching threshold value: α), the headlight 60 remains kept at low beam during the beam switching prohibited time Tp. During the light source appearance frequency observation time Tm, the irradiation direction of the headlight is switched at every light source appearance. Therefore, the light source appearance frequency observation time can also be referred to as a beam switching frequency observation time.

Figure 9:
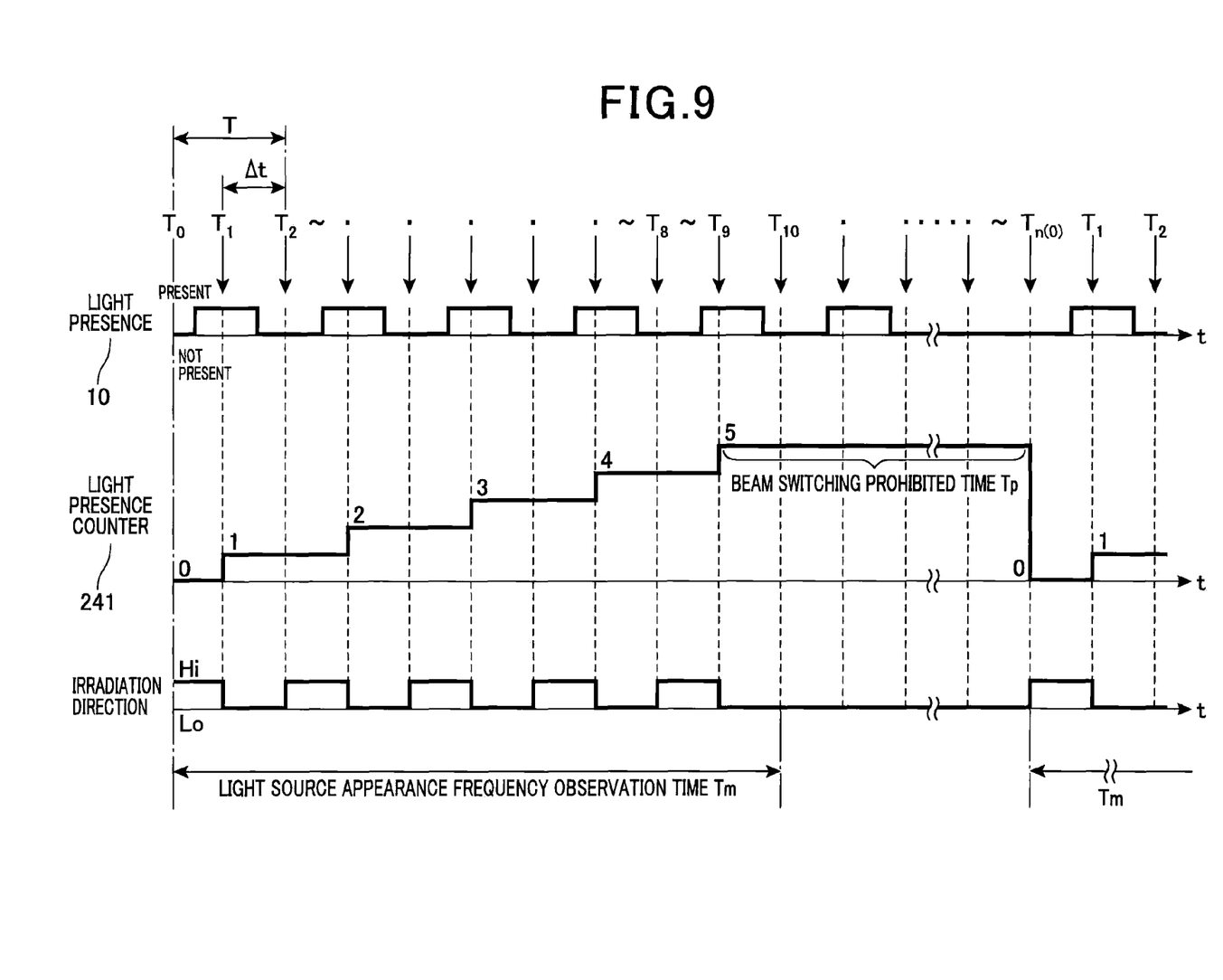
FIG. 9 is a timing chart of light distribution control by the headlight light distribution control device of the present invention.

Acquisition of information regarding the presence of a light source of a region ahead of the vehicle by the light source presence counter 241 is performed at a time interval Δt=T/2, when a value that the shorter time of either the light source appearance frequency observation time Tm and the beam switching prohibited time Tp is divided by N (N being an integer satisfying N≥α) is T (see FIG. 9).

In the example according to the present embodiment, the light distribution control of the headlight 60 will be described giving as an example an instance in which the light source appearance frequency observation time Tm (=1 sec)<beam switching prohibited time Tp, and N=5 (Δt=100 ms).

When judgment is made regarding whether or not the appearance frequency (frequency at which the light source changes from "not present" to "present") of the light source, in other words, the switching frequency of the beam reaches the beam switching threshold value α during the light source appearance frequency observation time Tm, and the beam switching threshold value α is reached, the headlight 60 remains kept at low beam for a predetermined amount of time (beam switching prohibited time Tp).

As a result, for example, in an instance in which the appearance frequency of the light source 50 is high, such as when there are numerous oncoming vehicles 70 or during travel through an urban area, the irradiation direction of the headlight 60 is at low beam for a predetermined amount of time. In other words, the state remains unchanged at low beam for a predetermined amount of time. Therefore, because the irradiation direction of the headlight 60 does not frequently change, the driver does not experience discomfort. The control can be performed by a simple process in which judgment is made regarding whether or not the number of times the light source 50 appears within the light source appearance frequency observation time Tm is a predetermined threshold value or more.

In addition, when the number of times the light source 50 appears within a predetermined amount of time reaches the predetermined threshold value (in other words, the appearance frequency of the light source reaches the predetermined threshold value), it is very likely that there are numerous oncoming vehicles 70 or the vehicle is traveling through an urban area. Therefore, in this instance, because the oncoming vehicle 70 is not irradiated as a result of the irradiation direction of the headlight 60 being set to low beam, the driver of the oncoming vehicle 70 is not dazzled by the light from the headlight 60 and safe driving can be ensured.

(Flow of Light Distribution Control)

Figure 6:
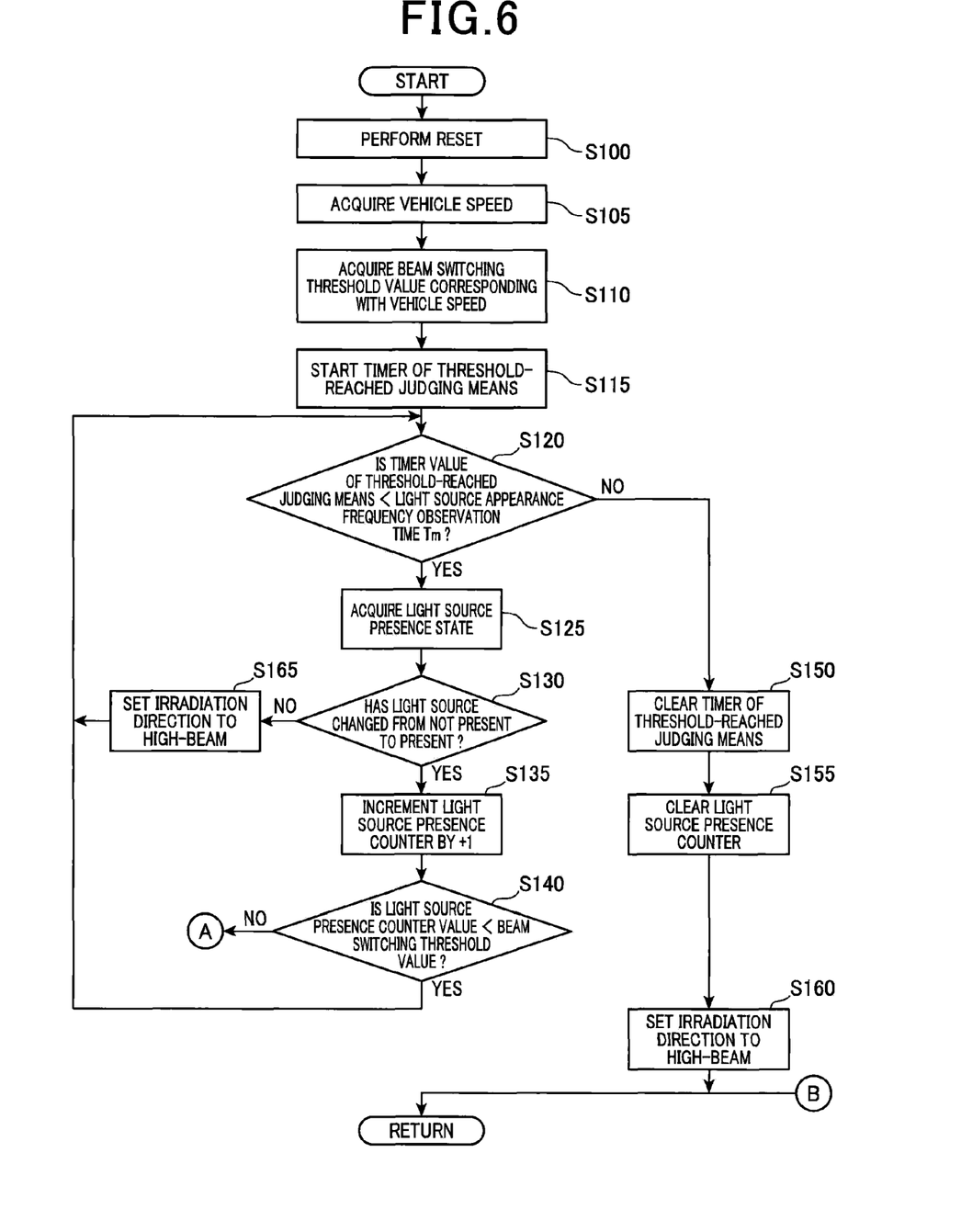
FIG. 6 is a flowchart showing a flow of light distribution control by the headlight light distribution control device of the present invention.
Figure 7:
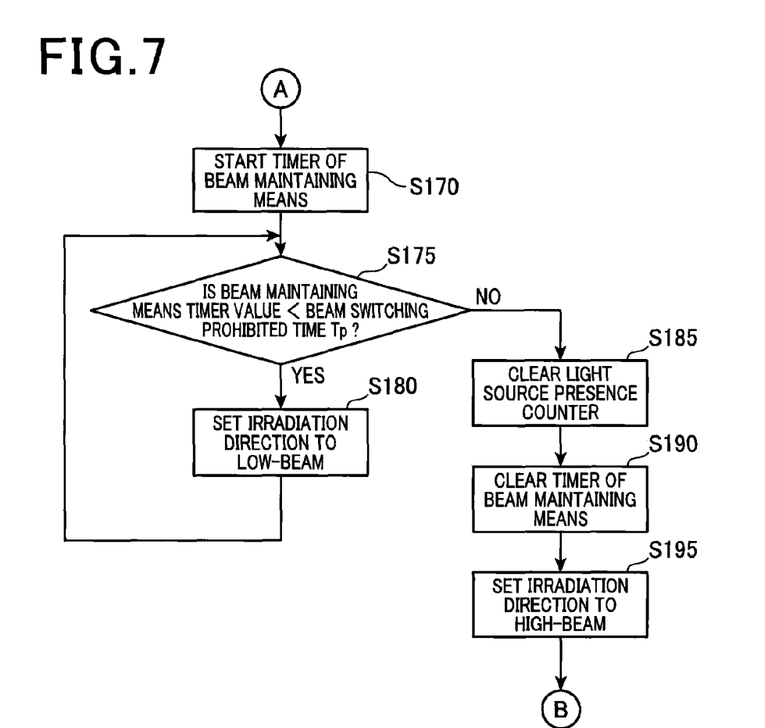
FIG. 7 is a flowchart showing the flow of light distribution control by the headlight light distribution control device of the present invention (continued from FIG. 6)

FIG. 6 and FIG. 7 are flowcharts of light distribution control by the headlight light distribution control device 1. FIG. 9 is a timing chart of the control. The process is performed by the CPU 21 of the control device 20. As shown in FIG. 6, first, reset is performed (step S100). During reset, the light source appearance frequency observation time Tm and the beam switching prohibited time Tp are loaded from the ROM 23, the light source presence state is set to "not present" in the RAM 24, and furthermore, the counter of the light source presence counter 241, and the timers of the threshold-reached judging means 242 and the beam switching means 244 are each set to "0".

Next, the speed of the vehicle 40 is acquired from the speed detecting device 30 (step S105) and the beam switching threshold corresponding to the acquired speed is recorded in the RAM 24 (step S110).

Next, the timer of the threshold-reached judging means 242 is counted upward (+1) (step S115) and a judgment is made regarding whether or not the time is smaller than the light source appearance frequency observation time Tm (step S120). In other words, a judgment is made regarding whether or not the time is within the light source appearance frequency observation time Tm.

When a judgment is made that the value of the timer of the threshold-reached judging means 242 is smaller than the light source appearance frequency observation time Tm (step S120:Yes), the state of the presence of the light source 50 of a region ahead of the vehicle 40 is acquired from the light source detector 10 at each predetermined timing ($T_1$, $T_2$, . . . ) (in other words, at time interval ΔT) (step S125), and a judgment is made regarding whether or not the acquired state of presence of the light source 50 changes from "not present" to "present" (step S130; see the state of light source presence at time $T_1$, $T_2$, . . . $T_n$ in FIG. 9).

Then, when a judgment is made that the state of the light source 50 has changed from "not present" to "present" (step S130:Yes), the light source presence counter 241 is incremented by +1 (step S135; refer to the value of the light source presence counter 241 at time $T_1$, $T_2$, . . . $T_n$ in FIG. 9). Then, a judgment is made regarding whether or not the value of the light source presence counter 241 is smaller than the beam switching threshold value α (step S140).

On the other hand, when a judgment is made at step S120 that the value of the timer of the threshold-reached judging means 242 has reached the light source appearance frequency observation time Tm (step S120:No), the timer of the threshold-reached judging means 242 is cleared (step S150; the value of the timer is set to "0") and the light source presence counter 241 is cleared (step S155). Then, the irradiation direction of the headlight 60 is set to high beam (step S160), and the process returns to step S120.

In addition, when a judgment is made at step S130 that the state of the light source 50 remains "not present" (step S130:No), the irradiation direction of the headlight 60 is switched to high beam (step S165) and the process returns to step S100.

When a judgment is made at step S140 that the value of the light source presence counter 241 is smaller than the beam switching threshold value α (step S140: "YES"), the process returns to step S120, a judgment is made regarding whether or not the value is within the light source appearance frequency observation time Tm, and the same process as that described above is performed.

At step S140, when a judgment is made that the value of the light source presence counter 241 is the beam switching threshold value α or more (step S140: No), the process proceeds to step S170 (see FIG. 7). At step S170, the timer of the beam maintaining means 243 is started, and at subsequent step S175, a judgment is made regarding whether or not the value of the timer of the beam maintaining means 243 is smaller than the beam switching prohibited time $T_p$. Then, when a judgment is made that the value of the timer of the beam maintaining means 243 is smaller than the beam switching prohibited time $T_p$ (step S175:Yes), the irradiation direction of the headlight 60 is set to low beam (step S180), and the process again returns to step S175 and the same procedure is subsequently repeated. In other words, when the count value (total incremented value) of the light source of a region ahead of the vehicle changing from "not present" to "present" during the light source appearance frequency observation time Tm reaches the beam switching frequency corresponding to the speed, the headlight 60 is set to low beam and the state is maintained for a predetermined amount of time (beam switching prohibited time Tp).

At step S175, when a judgment is made that the value of the timer of the beam maintaining means 243 is the beam switching prohibited time $T_p$ or more (step S175:No), the light source presence counter 241 is cleared (step S185), the timer of the beam maintaining means 243 is cleared at subsequent step S190, the irradiation direction of the headlight 60 is switched to high beam at subsequent step S195

(refer to the irradiation direction at $T_n$ in FIG. 9), the process again returns to step S100, and the same procedure is subsequently repeated.

As a result of the above-described light distribution control, in an instance in which the appearance frequency of the light source 50 is high, such as when there are numerous oncoming vehicles 70 or when the vehicle is traveling through an urban area, the headlight 60 does not frequently switch from high beam to low beam, thereby enabling discomfort of the driver to be eliminated.

Although the embodiment of the present invention is described above, the present invention is not limited by the present embodiment, and various embodiments can be used as described below.

(1) Although, according to the above-described embodiment, the irradiation direction of the headlight 60 is switched between high beam and low beam, the irradiation direction can be switched to middle-high beam instead of the high beam. In the instance of a headlight light distribution control device configured in this way, in addition to ensuring long-distance visibility by the driver, the possibility of the driver of the oncoming vehicle 70 becoming dazzled by the light from the headlight 60 is minimized by the shielded area. Therefore, while ensuring the safety of the oncoming vehicle, the driver of the vehicle is not subjected to discomfort. In the present application, "high beam" in the scope of claims includes the "middle-high beam" in the example.

(2) In addition, when a light sensor such as a CdS is used s the light source detector 10, to extend the light-source detection distance, an optical system device configuring a lens and the like may be set in a front portion of the light sensor.

The light source presence counter 241 configures a light source appearance frequency detecting means.

EXPLANATION OF REFERENCE NUMBERS

1: headlight light distribution control device
10: light source detector
12: imaging device
14: image processing section
20: control device
30: speed detecting device
40: vehicle
50: light source
60: headlight
62: actuator
70: oncoming vehicle

The invention claimed is:

1. A headlight light distribution control device which is mounted on a vehicle and switches an irradiation direction of a headlight of the vehicle, the headlight light distribution control device comprising:
a light source detector which detects a light source of a region ahead of the vehicle; and
a control device that controls the irradiation direction of the headlight, wherein the control device comprises:
a light source presence counter that acquires information on the presence of a light source of a region ahead of the vehicle per predetermined time interval from the light source detector and counts the number of times the light source of a region ahead of the vehicle changes from not present to present;
a threshold-reached judging section that judges whether or not the number of times counted by the light source presence counter has reached a predetermined threshold value within a predetermined amount of time (Tm); and
a beam maintaining section that keeps the headlight at low beam for a predetermined amount of time (Tp), based on the number of times counted by the light source presence counter and a speed of the vehicle detected by a speed detecting device, the beam maintaining section being configured to keep the headlight at low beam for the predetermined amount of time (Tp), on a condition that the counted number of times that the speed of the vehicle is high is larger than the counted number of times that the speed of the vehicle is low.

2. The headlight light distribution control device according to claim 1, wherein
the acquisition of the information on the presence of the light source of a region ahead of the vehicle by the light source presence counter is performed at a time interval $\Delta t=T/2$, where T is a value obtained by dividing the shorter time of either the predetermined amount of time (Tm) or the predetermined amount of time (Tp) by N, N being an integer satisfying $N \geq \alpha$.

3. The headlight light distribution control device according to claim 1, wherein
the control device further comprises
a beam switching section that switches the headlight to high beam when the predetermined amount of time (Tp) has elapsed.

4. The headlight light distribution control device according to claim 3, further comprising
an actuator configured by a driving section that switches the irradiation direction of the headlight and a drive control section that drives the driving section according to a command from a processor, wherein
when the beam switching section transmits a control signal for switching the irradiation direction of the headlight to the drive control section, the drive control section switches the irradiation direction of the headlight on the basis of the transmitted control signal.

5. The headlight light distribution control device according to claim 1, wherein
the light source detector further comprises:
an imaging device that captures an image of a region ahead of the vehicle; and
an image processing section that detects whether or not a light source is present in a region ahead of the vehicle by processing the image of a region ahead of the vehicle captured by the imaging device.

6. A headlight light distribution control method for switching irradiation direction of the headlight of a vehicle, the headlight light distribution control method comprising:
counting, by a light source presence counter, the number of times a light source of a region ahead of the vehicle changes from not present to present per predetermined time interval in a predetermined time;
judging, by a threshold-reached judging section, whether or not the number of times has reached a predetermined threshold value within a predetermined amount of time (Tm); and
keeping, by a beam maintaining section, the headlight at low beam for a predetermined amount of time (Tp), based on the number of times counted by the light source presence counter and a speed of the vehicle detected by a speed detecting device, wherein
the keeping step keeps, by the beam maintaining section, the headlight at low beam for the predetermined amount of time (Tp), on a condition that the counted number of times that the speed of the vehicle is high is larger than the counted number of times that the speed of the vehicle is low.

7. The headlight light distribution control method according to claim 6, wherein
the counting step is performed at a time interval Δt=T/2, where T is a value obtained by dividing the shorter time of either the predetermined amount of time (Tm) or the predetermined amount of time (Tp) by N, N being an integer satisfying N≥α.

8. The headlight light distribution control method according to claim 6, further comprising
switching the headlight to high beam when the predetermined amount of time (Tp) has elapsed.

9. The headlight light distribution control method according to claim 8, wherein
the switching step is performed by transmitting a signal from a processor to an actuator which performs beam switching of the headlight.

10. The headlight light distribution control method according to claim 6, wherein
the counting step is performed by processing the image of a region ahead of the vehicle captured by an imaging device.

* * * * *